United States Patent [19]

Esposito

[11] Patent Number: 4,616,560
[45] Date of Patent: Oct. 14, 1986

[54] GREENHOUSE CONSTRUCTION PROVIDED WITH SPECIAL RIDGE FOR VENTILATION

[75] Inventor: Christopher Esposito, West Bay Shore, N.Y.

[73] Assignee: Four Seasons Solar Products Corp., Farmingdale, N.Y.

[21] Appl. No.: 718,949

[22] Filed: Apr. 2, 1985

Related U.S. Application Data

[63] Continuation of Ser. No. 565,989, Dec. 27, 1983, which is a continuation of Ser. No. 280,992, Jul. 6, 1981, Pat. No. 4,438,680, which is a continuation-in-part of Ser. No. 77,786, Sep. 21, 1979, Pat. No. 4,316,405.

[51] Int. Cl.$^4$ .............................................. A61G 9/24
[52] U.S. Cl. ...................................... 98/42.02; 47/17
[58] Field of Search ............ 47/17; 52/62, 93, 173 R; 98/33.1, 29, 42.02, 42.06, 42.12, 42.21, 116

[56] References Cited

U.S. PATENT DOCUMENTS

| | | | |
|---|---|---|---|
| 1,844,911 | 2/1937 | Shuman | 98/42.12 |
| 3,064,548 | 11/1962 | Field | 98/42.12 |
| 3,085,490 | 4/1963 | Field | 98/42.12 X |
| 3,241,273 | 3/1966 | Struben | 52/63 |
| 3,267,955 | 8/1966 | Lugan et al. | 98/33.1 X |
| 3,479,947 | 11/1979 | Myers | 98/116 |

FOREIGN PATENT DOCUMENTS

| | | | |
|---|---|---|---|
| 735145 | 5/1966 | Canada | 52/93 |
| 70502 | 1/1950 | Denmark | 47/17 |
| 2305122 | 10/1976 | France | 47/17 |
| 1777 | of 1859 | United Kingdom | 47/17 |
| 1870 | of 1870 | United Kingdom | 47/17 |
| 148551 | of 1882 | United Kingdom | 47/17 |

OTHER PUBLICATIONS

"Solar 21", Lord and Burnham, Burnham Corp., Irvington, New York.
"Sunlyt 6", Lord & Burnham, Burham Corporation, Irvington, N.Y.

*Primary Examiner*—Harold Joyce
*Attorney, Agent, or Firm*—Roberts, Spiecens & Cohen

[57] ABSTRACT

A greenhouse construction is provided for support against a supporting structure such as a house. The greenhouse construction comprises a glazing structure consisting of glazing and glazing bars. There is also provided a ridge which supports the glazing structure against, but spaces the same from the supporting structure. The ridge includes openings respectively opening into an enclosure defined by the glazing structure and into ambient atmosphere and there is also provided a blower which exhausts air from the enclosure and expels it into ambient atmosphere via one of the aforesaid openings. The ridge is provided in the form of a plurality of channels, one of which has a face adapted for abutting against the supporting structure and defining a pocket for receiving the glazing bars. Another of the channels is supported on the channel with the aforesaid pocket and this additional channel is provided with its own pocket for supporting a flashing structure. Still another of the channels is supported in suspended relationship from the channel which supports the flashing structure and finds still another pocket wherein is accommodated the glazing. Yet another channel is supported in suspended relationship and defines with the first said channel an opening which is the opening through which communication is made with the enclosure defined by the glazing structure.

7 Claims, 5 Drawing Figures

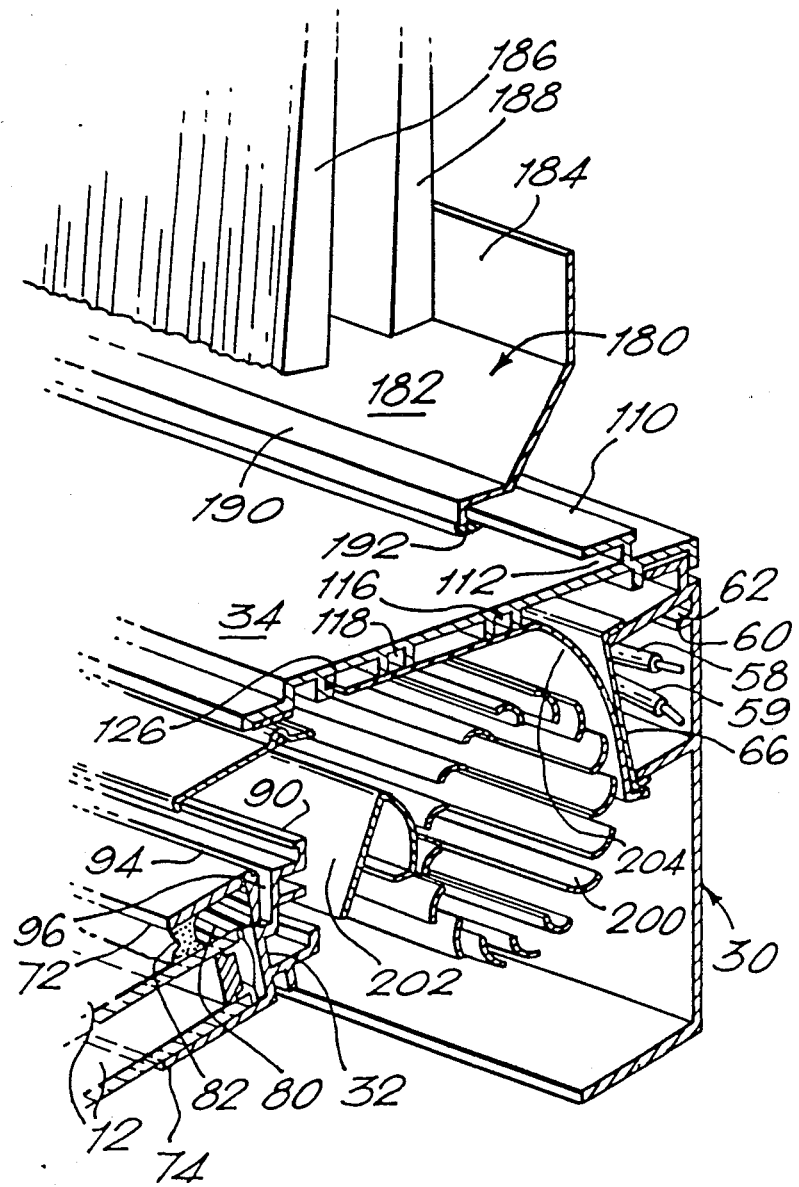

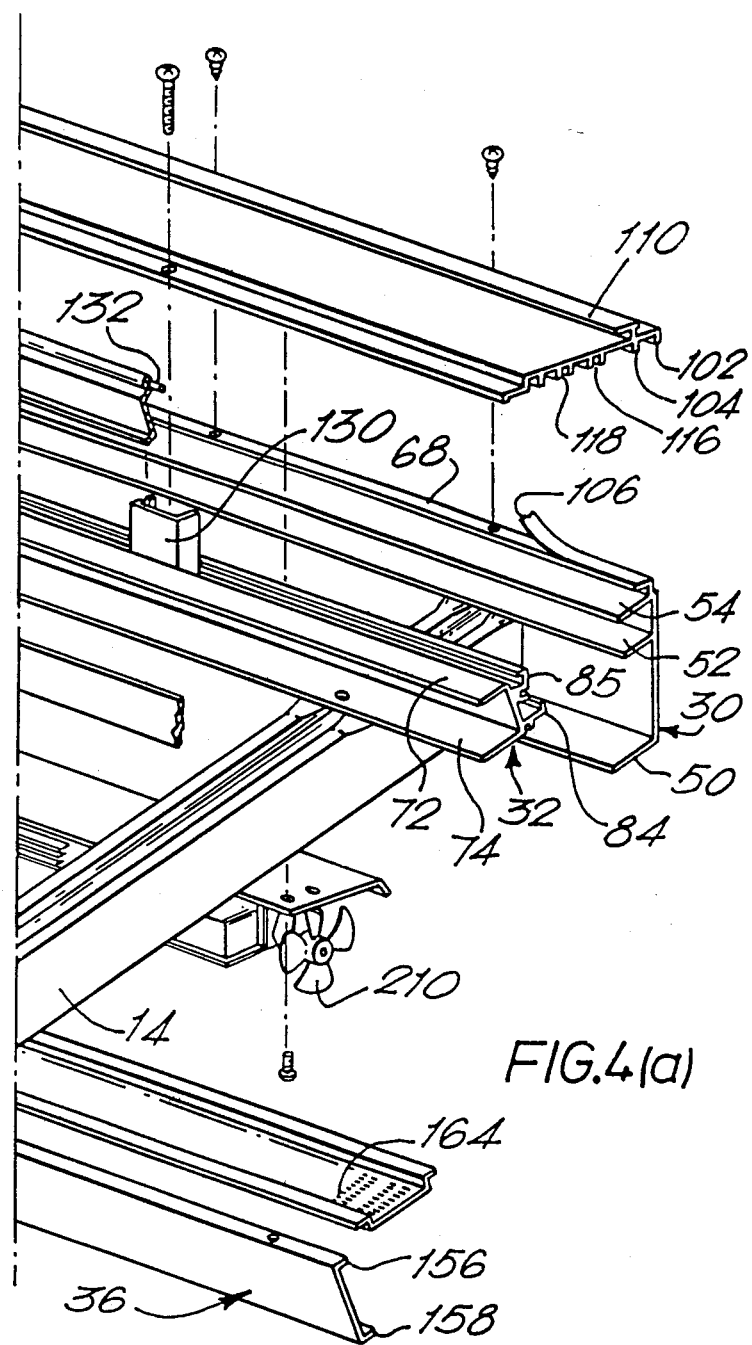

GREENHOUSE CONSTRUCTION PROVIDED WITH SPECIAL RIDGE FOR VENTILATION

OTHER APPLICATIONS

This application is a continuation of my earlier filed and co-pending application Ser. No. 565,989 filed Dec. 27, 1983 which in turn is a continuation of my application Ser. No. 280,992 filed July 6, 1981, now U.S. Pat. No. 4,438,680, which is a continuation-in-part of my earlier filed application Ser. No. 77,786 filed Sept. 21, 1979, now U.S. Pat. No. 4,316,405.

FIELD OF INVENTION

This invention relates to greenhouse constructions and improvements therefor whereby selective venting may be effected.

BACKGROUND

There are many prior patents which deal with greenhouse constructions, some of which also deal with selective venting for purposes of controlling humidity and temperature within greenhouse enclosures or the like. Some of these patents include U.S. Pat. Nos. 841,306; 1,844,911; 3,063,195; 3,359,882; 3,401,621; 3,562,972; and 3,951,336. Foreign patents which may also be considered include British Pat. Nos. 1,777 and 11,106 as well as French Pat. No. 563,865. Some publications may also be considered pertinent such as "Sunlyt 6", Lord & Burnham, Burnham Corporation of Irvington, New York and "The Sunlyt Lean-To Greenhouse", New Sunlyt Glass Garden, Lord & Burnham Co., page 8.

The Lord & Burnham catalogues show various types of greenhouses, all of which are satisfactory greenhouses to the extent intended but none of which provide for the particular construction and advantages as will be apparent from the description of the present invention as follows in detail hereinafter.

Other of the patents have some pertinence to the present invention such as, for example, the Aaberg U.S. Pat. No. 3,401,621 which shows the venting of an interior structure by means of a blower which is mounted near the ridge line of an associated structure.

The Ravich U.S. Pat. No. 3,063,191 shows an artificially climatized greenhouse wherein a ridge is provided which affords a certain type of ventilation. Similarly, the D'Amato U.S. Pat. No. 3,562,972 shows a lean-to type greenhouse construction in which is afforded a certain amount of climate control.

The Klosz U.S. Pat. No. 4,164,106 similarly shows the mounting of hinged doors in order to provide for ventilation with means for operating the doors to open and close the same simultaneously.

As will become apparent hereinafter, however, none of the foregoing patents or articles, nor any other known structure, provides for the improved ridge type ventilation afforded by the present invention as will be described in greater detail hereinafter.

SUMMARY OF INVENTION

It is an object of the invention to provide an improved greenhouse and/or solarium type of construction.

It is another object of the invention to provide an improved greenhouse structure with improved means for ventilation and climate control.

Yet another object of the invention is to provide an improved greenhouse construction having maximum security against inclement weather conditions.

Still another object of the invention is to provide an improved greenhouse construction having provision for great flexibility and ease of installation.

In achieving the above and other objects of the invention, there is provided a greenhouse construction adapted for being supported against a supporting structure such as a dwelling or the like. This improved greenhouse construction comprises a glazing structure defining an enclosure and a ridge means for supporting said glazing structure against but spacing said glazing structure from said supporting structure. The aforesaid ridge means is provided with openings respectively opening into said enclosure and into ambient atmosphere and a blower which is provided to exhaust air from the enclosure via one of said openings and expel air via the other of said openings into the ambient atmosphere. The ridge structure may include a screening across the opening into the aforesaid enclosure and a pivotal flap may be provided across the opening into ambient atmosphere. This flap is of relatively light weight and is openable by the force of the above-mentioned blower.

In accordance with the invention the ridge structure is fabricated of a plurality of channel members, these channel members being interconnected and defining a chamber in which the aforesaid blower is accommodated. This arrangement of channels furthermore defines the aforesaid openings which enable air to be withdrawn from the enclosure and expelled into ambient atmosphere.

According to the invention, a first of the above-mentioned channels has a flat face adapted for resting in abutting relationship against the supporting structure. A second of the channels is coupled to the first channel and defines a pocket for receiving the glazing structure. The aforesaid pocket is inclined relative to the above-mentioned face, the glazing structure including a sloped upper extremity received in this pocket.

In further accordance with the invention, a third of the above-mentioned channels is supported on the first channel and defines with the second channel to opening which opens into ambient atmosphere. The third channel supports the second channel in suspended relationship. According to a feature of the invention, pillar members are provided between the second and third channels and a flap as mentioned above is pivotally supported on the pillar members for selectively obturating the opening ino ambient atmosphere. As mentioned above, this flap may be of relatively high weight and is adapted for being opened by the force of the blower means.

In accordance with yet another aspect of the invention, the third channel constitutes at least a part of a top structure for the ridge structure and includes receptacles and fasteners in these receptacles to suspend the blower in depending relation therefrom. In addition, one of the channels defines a passageway adjacent the blower wherein is accommodated wiring for connection to the blower for the supply of power thereto.

According to yet another aspect of the invention, the first channel defines a passageway or pocket to receive the glazing rods forming a part of the glazing structure. Still further, a fourth channel is provided in suspended relationship relative to the second channel to operate in conjunction with the first channel to form a support for a screen which screens the opening by means of which air is vented from the enclosure defined by the glazing construction.

As will be shown in greater detail hereinafter, the second channel includes a claw including an edge for contacting the above-mentioned flap and forming a weather seal therewith. The flap is preferably provided with a protrusion for engaging against the edge of the claw. This claw, as will be shown hereinafter, extends upwardly and forms a water barrier against the penetration of rain, the second channel defining a water drip pan beneath this barrier and extending in opposite direction from the pocket which is intended to accommodate the glazing.

A fourth channel mentioned in greater detail hereinafter, defines a condensation drain below the water drip pan and provides thereby additional means for avoiding the penetration of moisture into the greenhouse or solarium.

As will also be shown in greater detail hereinafter, the first channel includes an extension and said third channel is provided with a receptacle for accommodating this extension, there being furthermore provided fasteners for locking this extension in the receptacle in the third channel.

It will also be pointed out in greater detail hereinafter that the second channel is provided with an extension defining a flashing pocket, said greenhouse construction further including flashing engaging in said pocket and extending into the supporting structure. Moreover, it will be shown that the first channel defines a longitudinal sloped pocket wherein the glazing structure bars are received as is consonant with the usually sloped upper configuration of greenhouse constructions.

Viewing the invention from another aspect, it will be seen that the glazing structure includes both glazing and glazing bars and that the first channel mentioned above abuts the supporting structure and defines a pocket to receive the glazing bars with a second channel defining a pocket to receive the glazing and a third channel connecting the second channel to the first channel and supporting the second channel in suspended relationship. In connection with this aspect of the invention it will be noted that means are provided spacing the second and third channels to define the opening which vents into ambient atmosphere, there being provided the above-mentioned flap for selectively obturating this opening.

Other objects, features and advantages of the invention will be found in the following detailed description of a preferred embodiment of the invention as illustrated in the accompanying drawing.

DETAILED DESCRIPTION OF DRAWING

In the drawing:

FIG. 3 is a perspective view illustrating how the flashing is accommodated in the supporting structure; and FIGS. 4a and 4b are an exploded view showing how the various channel members of the invention cooperate to form a ridge venting structure.

DETAILED DESCRIPTION

Greenhouses of the invention are elegantly designed and proportioned to complement the beauty of the dwelling to which they may be attached. They form an exciting and versatile kind of additional space that captures and stores solar energy. They may incorporate weatherproof double or triple factory-insulated panels of tempered safety glass which have become the standard. A thermal-break glazing system frames each panel on all sides to insure weather tightness. The greenhouse of the invention incorporates a power ridge vent which has a double air lock to prevent heat loss and includes a variable speed blower for quiet and efficient ventilation. All fasteners may be of stainless steel and hidden with a snap-on cap for a very clean look. The slim line tubular aluminum frame is provided with integral grooves for attaching shelving, lighting and so forth. Concealed wiring may be run through hollow framework. This type of greenhouse requires no maintenance and is breakproof and weatherproof.

The power ridge vent is an integral part of the greenhouse frame when installed therewith. It is compact so as not to interfere with the graceful lines of the greenhouse and yet it gives positive summertime ventilation which can be automatically controlled. A continuous aluminum housing along the ridge is formed by a top which may project, for example, less than six inches and may cooperate with a standard ridge. A plurality of blowers may be provided in each respective bay along the length of the greenhouse, each of which blowers may mechanically exhaust over 200 cubic feet per minute each. Additional blowers may be optionally installed as desired and an electric wire chase or pocket will allow the hookup of blowers and will allow the addition of electrical wiring through tubular greenhouse glazing bars.

The ridge provided in accordance with the invention outperforms any known greenhouse ridge went and is provided, as will be shown, with a gravity type shutter which opens and closes with blower operation and keeps out driving wind and rain. A condensate trap carriers moisture into a main weep system of the greenhouse and a thermal break insulates inside metal from cold outside metal and an inside storm panel for winter use may be employed between the ridge and header screw attachment.

Figure 1:
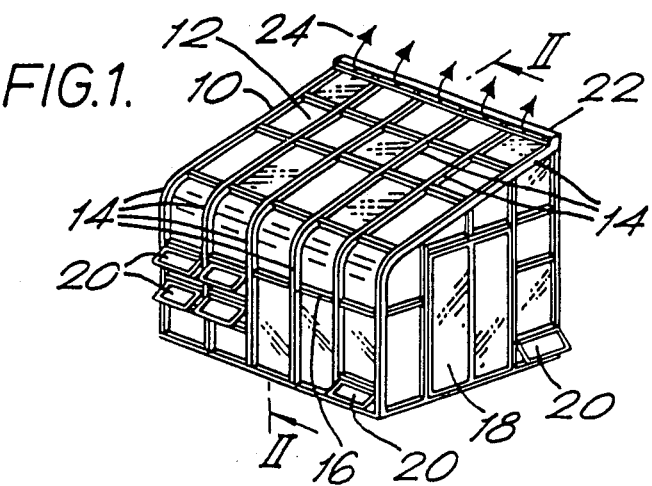
FIG. 1 is a perspective view of a greenhouse provided with a ridge structure in accordance with the invention.
Figure 2:
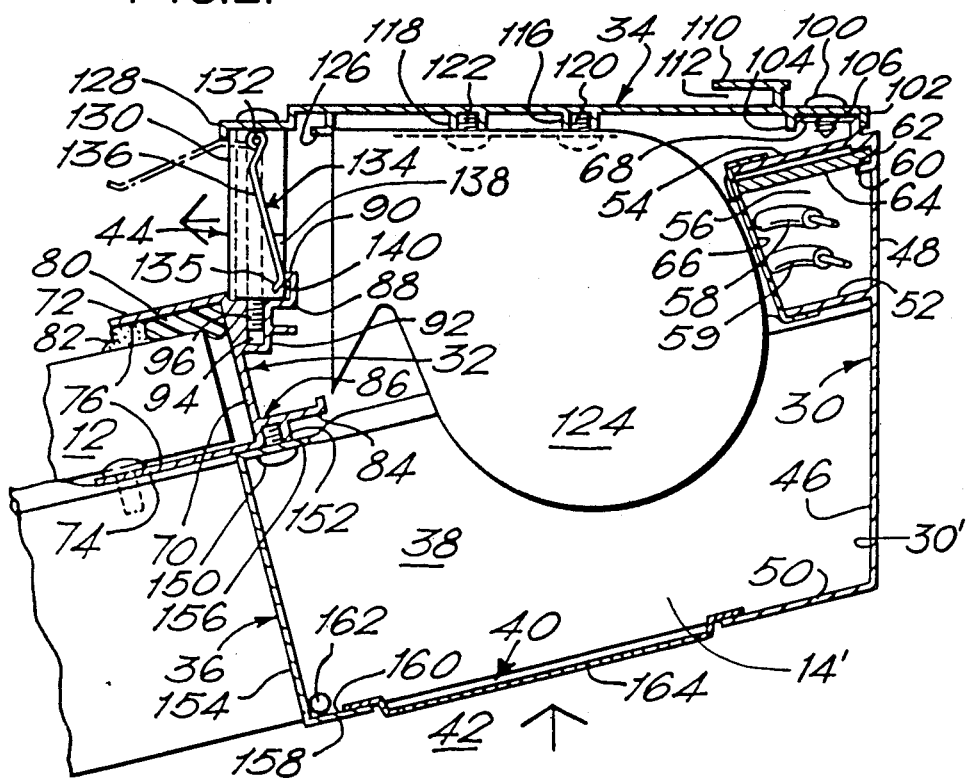
FIG. 2 is a cross-sectional view of a section of the ridge structure illustrating the different channels employed therein.

With more particular reference to FIG. 1, it is seen that a greenhouse (10) consists of a plurality of glazing panels (12) supported between a plurality of glazing rods (14) there being moreover provided a plurality of muntins (16). Doors (18) are optionally placed as are venting windows (20). The ridge is indicated at (22) with ventilation being provided as indicated by arrows (24).

FIGS. 2-3 and 4a-4b illustrate the detailed construction of the ridge of the invention and the ventilation provided in accordance therewith as well as the cooperation of this ridge with other structural members of the greenhouse.

First of all, it is to be noted that the ridge is provided from a cooperative interdependent arrangement of channels. More particularly, the ridge comprises a first channel (30), a second channel (32), a third channel (34), and a fourth channel (36).

These four channels cooperate to define a chamber (38) having an opening (40) which opens into the enclosure (42) within the greenhouse and an opening (44)

which connects the opening into the ambient atmosphere.

Channel 30 includes a web (44) having a face (48) which is flat and which is intended to abut against the supporting structure, such as the wall of a dwelling. Channel 30, moreover, has a leg (50) sloping downwardly and parallel with a second leg (52) to define a pocket intended to receive at one extremity or the other of the greenhouse, a glazing rod (14). A third sloped member (54) is provided which defines with sloped member (52) a passageway or chase (56) wherein are accommodated wires such as indicated, for example, at 58 and 59, which are adapted to be connected to one or more of the blowers or fans of the assembly which afford positive mechanical venting of the interior of the greenhouse.

In addition to the foregoing, it will be noted that the member (30) is provided with a further protrusion or extension (60) which defines a receptacle (62) wherein is accommodated a fastening member or belt (64), the purpose of which is to enable the locking of a cover (66) on the chase or passageway (56) to confine therein the wiring intended to supply the blowers or other electrical instrumentation in the greenhouse.

Further to the above, the channel 30 is provided with an additional lip or extension (68). This lip or extension (38) is intended for connection with the third channel (34) as will be described in greater detail hereinafter. The lip (38) is horizontal in contrast to the sloped conformation of members 50, 52 and 54.

The second channel (32) consists of a web (70) having arms (72) and (74) extending therefrom in sloped conformation corresponding to that of members 50, 52 and 54. These members (72) and (74) define a pocket or receptacle (76), the function of which is to receive and accommodate glazing such as indicated at 12 in both FIGS. 1 and 2. It will be noted that the glazing (12) is provided with a backing rod (80) and caulking (82), both of which are to provide for the firm mounting of the glazing panel (12) and for the insulation against the penetration of rain or other weather elements.

Channel 32 is moreover provided with a lip (84) defining a weather drip pan (86), the purpose of which will be indicated in greater detail hereinafter. Moreover, the channel 32 is provided with a claw (88), the upper extremity of which is indicated at 90, which forms part of the weather seal to be indicated in greater detail hereinafter. The shape of the claw (88) with the edge (90) thereon is to form a water barrier as will become more evident in the description which follows hereinafter. The claw (88) is mounted on an arm (92) which, together with the body of channel 32, defines an opening or receptacle (94) for a fastener (96), the purpose of which will be indicated in greater detail hereinafter.

The top or third channel 34 has been indicated herein-above as being mounted on the first channel 30. For this purpose, a fastener or screw (100) is employed which penetrates through the extremity of the channel 34 superposed on arm 68 of channel 30 to enable alignment of the two and appropriate connection between these two channels, the channel 34 is provided with a lip (102) and with a rib (104) defining a space therebetween within which is accommodated the arm (68) on channel 30. Mounted between these two channels is a thermal-break tape (106), the purpose of which is to prevent the transfer of heat or cold as between these members for purposes of insulation and temperature regulation.

Channel 34 is moreover provided with an extension (110) defining a pocket or receptacle (112). As will be shown hereinafter with reference to FIG. 3, the pocket (112) is a flashing accommodation pocket whereby further weatherproofing is afforded as between the supporting structure and the ridge.

Channel 30 is moreover provided with a plurality of pockets or receptacles as indicated at 116 and 118 wherein are shown respective fastening members 120 and 122. These fastening members suspend from channel 30 the fan or blower (124) which will be described in greater detail hereinafter. The fan (124) is intended to exhaust air from the interior (44) of the greenhouse via opening (40) and to expel this air via opening (44) into ambient atmosphere.

The fan abuts against a brace indicated at 126 and the channel 34 is moreover provided with an extension or arm (128) defining with the upper extremity of channel 32 the opening (44) as mentioned above. The extension or lip (128) also cooperates with the fastener (96) for purposes of mounting U-shaped brackets (130), the purpose of which is to space the channels 32 and 34 from one another in order to form the opening (42) while at the same time to connect the channel (32) indirectly in suspended relationship from the channels 30 and 34.

Mounted on brackets 130 are pivots such as indicated at 132, such pivots supporting in turn a pivotal flap or closure (134), the purpose of which is to selectively obturate the opening 44. The flap (134) is of aluminum and relatively thin and is therefore of a relatively light weight, such that it is automatically opened under the force of air expelled by the fan or blower (144). The flap (134) is formed of two angularly connected sections (136 and 138) so that there is defined a ridge line or point (140) which contacts with the edge (90) of claw (88) whereby to form a weather seal against the penetration of moisture or rain or the like. Should, however, such penetration occur in minor amounts, the water drip pan (38) mentioned here-in-above, is located directly beneath the same, so that an accumulation of such unexpected moisture or water may be confined and vented gradually by means of evaporation.

Suspended from channel 32 is the fourth channel (36) by means of a fastening member (150) accommodated in a receptacle (152) formed a channel member 32. Channel 36 is a relatively simple U-shaped channel having webs (154) and arms (156 and 158). Arm 158 forms with web 154 a moisture collector (166) there being provided at the extremity of the ridge one or more openings (162) which enable a venting of moisture collected at 160. This means that there are three water barriers or collectors provided to operate in cooperation with one another, namely that formed by edge (90) of claw (88), the water pan (86) and collector (160).

Arm (158) of channel 36 forms with arm 50 of channel 30 the opening (40) which has been noted above. There may be suspended by engagement with these arms a screen (164) which is replaceable and therefore removable. This screen is intended to screen air evacuated from enclosure (42). It is employed in the summertime. During wintertime when it is desired to exclude cold air with greater efficiency, the screen (164) may be provided with a solid insulating pan or the like, which also engages with the arms (50 and 158).

FIG. 3 illustrates more particularly the flashing (180) accommodated in pocket (112) defined by lip (110) in channel 34. More particularly, the flashing (180) consists of portion 182 inclined upwardly towards portion 184 monolithic therewith and extending behind, for example, shingles 186 and 188 against the wall of the dwelling constituting the supporting structure. Below the section 182 is section 190 connected to lip 192 extending into the pocket (112) and forming an engagement therewith. This total structure constitutes a weatherproof barrier avoiding the penetration of rain and other weather elements which might detract from the weather integrity of the structure as a whole.

Also visible in FIG. 3 are the plurality of blades (200) constituting the mechanical air propulsion elements of the fan (124), the protection frame portions of which are indicated at 202 and 204.

Figure 4B:
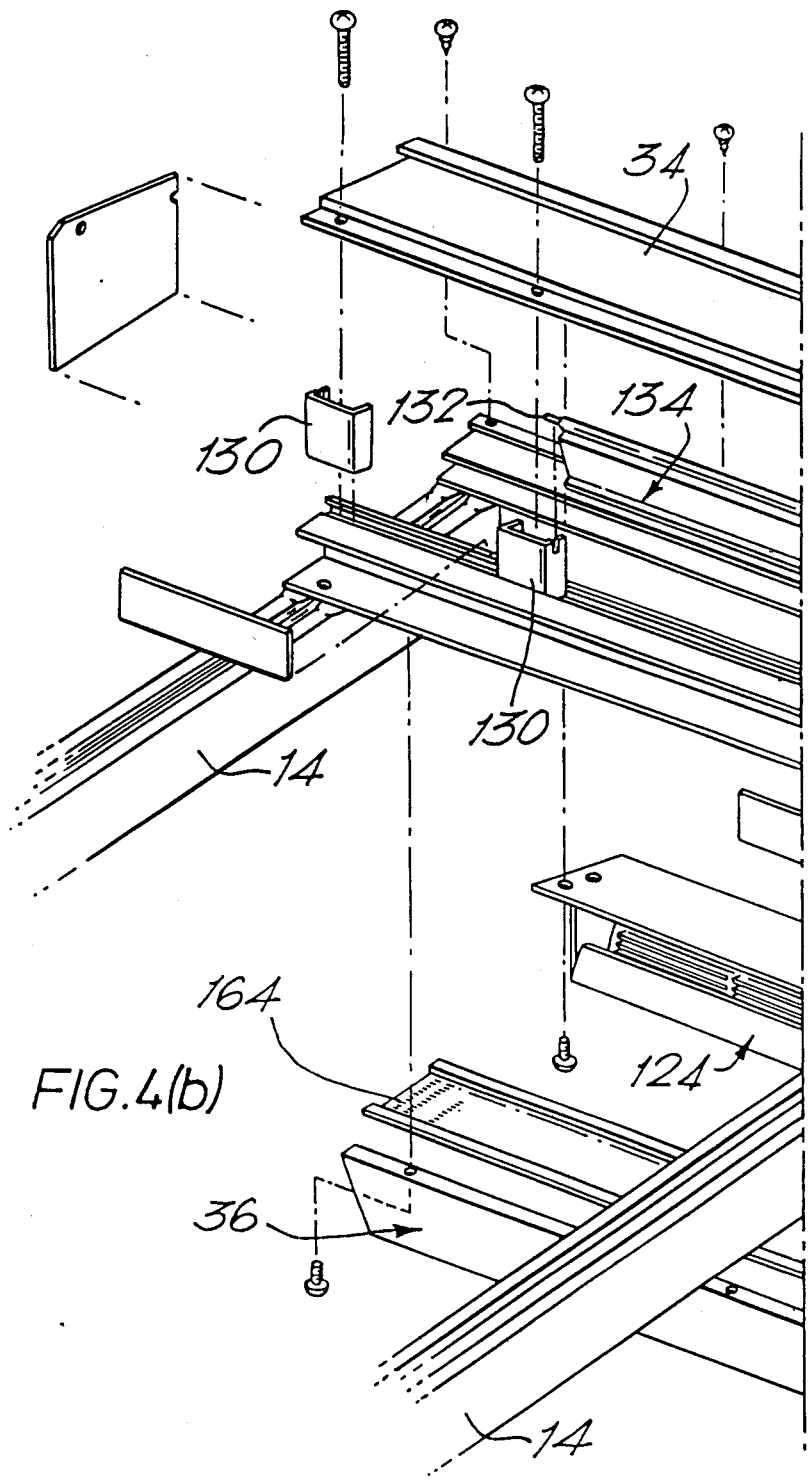

FIGS. 4a and 4b illustrate in addition to the other elements which have been discussed herein above and the connectors therefor, the fans (210) provided at the ends of the blower. These fans intended to cool the blower for effective operation of the same.

From what has been described here-in-above it will now be seen that the invention provides an arrangement wherein a glazing structure includes glazing and glazing bars and wherein a ridged structure is provided in the form of four connected channels, the first of which abuts the supporting structure and defines a pocket to receive the glazing bars with a second of the channels defining a pocket to receive the glazing. A third of the channels connects the second channel to the first channel and supports the second channel in suspended relationship, while the fourth channel provides for defining an opening by means of which the interior of the greenhouse is evacuated of stale or moisture-laden air.

There will now be obvious to those skilled in the art many modifications and variations of the structure set forth here-in-above. These modifications and variations will not depart from the scope of the invention if defined by the following claims.

What is claimed is:

1. A greenhouse or solarium construction comprising a framework adapted for abutting a supporting structure, glazing on said framework and defining with said framework and supporting structure an enclosure, said framework including a plurality of glazing bars for supporting said glazing, said glazing bars including sloped upper extremities, said glazing including at least one sloped glazing section supported by said sloped under extremities of said glazing bars, said framework including ridge means abutting the supporting structure and receiving said sloped upper extremeties of said glazing bars, said sloped glazing section having an edge portion at least partly defining an opening located between the edge portion and said ridge means, pocket means for receiving said glazing section, and blower means in said opening at least partly obturating the same and coupled by said pocket means to said edge portion of said glazing section for the venting of said enclosure.

2. A greenhouse or solarium construction as claimed in claim 1 wherein the pocket means is provided with a pocket, said pocket and edge portion being sloped at corresponding angles.

3. A greenhouse or solarium construction as claimed in claim 2 wherein the blower means includes a casing and a blower within and supported by the casing, said casing defining a passage for venting said enclosure to the outside of the construction.

4. A greenhouse or solarium construction as claimed in claim 3 wherein the casing extends into said enclosure between the sloped upper extremities of adjacent glazing bars.

5. A greenhouse or solarium construction as claimed in claim 4 wherein the casing extends above said edge portion and is provided with a venting opening defining a direction of flow along said edge portion.

6. A greenhouse or solarium construction as claimed in claim 5 comprising means to receive flashing extending between the framework and the supporting structure.

7. A greenhouse or solarium construction as claimed in claim 3 wherein said casing is supported between said ridge means and said edge portion.

* * * * *